C. T. HAAS.
Liquid-Filter.
No. 207,515.  Patented Aug. 27, 1878.
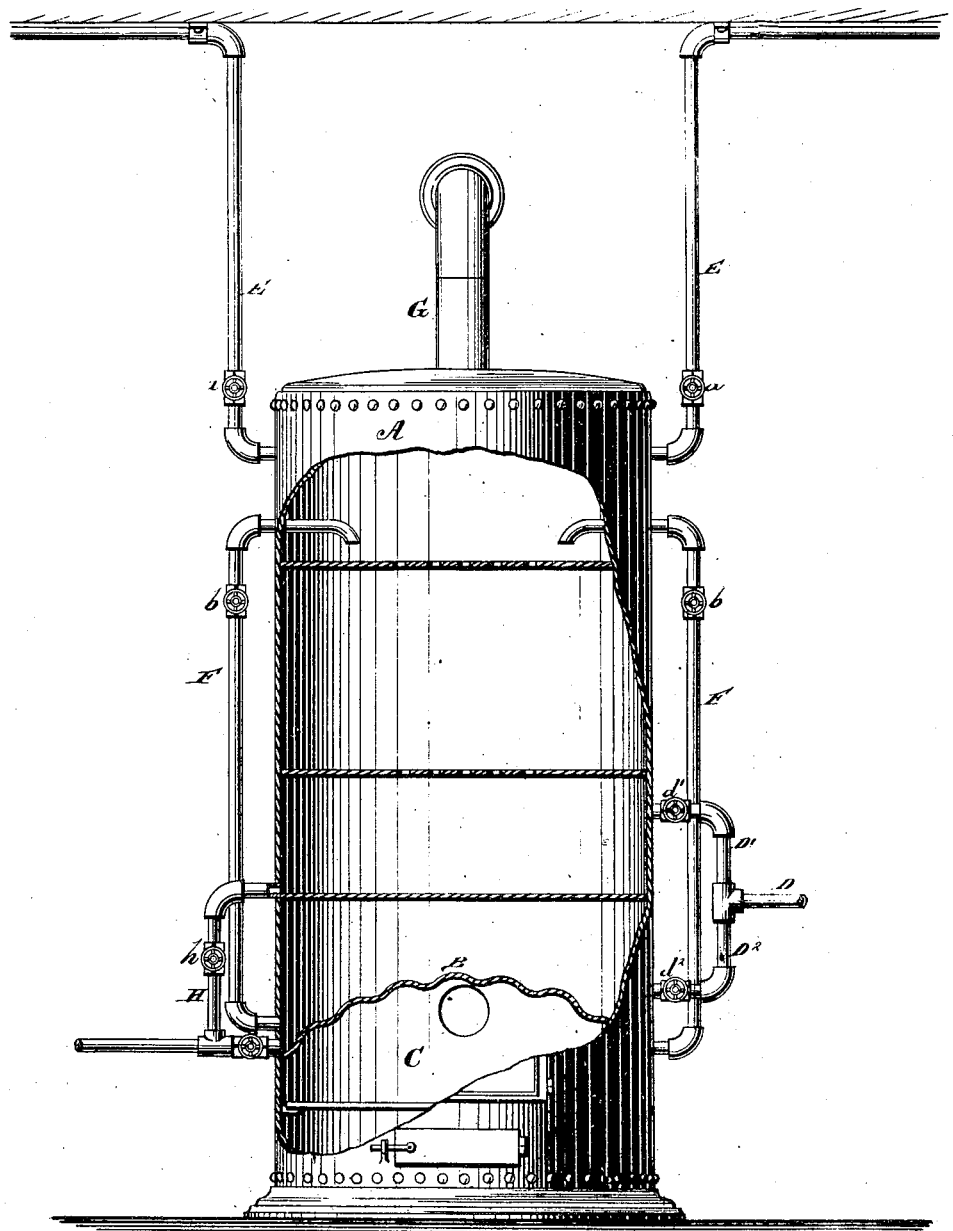
WITNESSES  INVENTOR

UNITED STATES PATENT OFFICE.

CHARLES T. HAAS, OF PHILADELPHIA, PENNSYLVANIA.

IMPROVEMENT IN LIQUID-FILTERS.

Specification forming part of Letters Patent No. 207,515, dated August 27, 1878; application filed March 2, 1878.

*To all whom it may concern:*

Be it known that I, CHARLES T. HAAS, of Philadelphia, in the county of Philadelphia and State of Pennsylvania, have invented a new and useful Improvement in Liquid-Filters, which improvement is fully set forth in the following specification and accompanying drawing.

The figure of the drawing is a side elevation, partly broken away to show the interior.

My invention relates to filters; and it consists in providing the filter with a water-back and fire-box, and a system of pipes so arranged that when necessary to cleanse the filter fire may be started in the fire-box and the water heated and a reverse current of hot water passed through the filter.

It is well known that charcoal filters must at times be cleansed by a reverse current of hot water passed through the filter. Where the filter can be connected to an ordinary house-boiler this has been easily done; but in latitudes or places where no such boilers are in use the filter would in time become so clogged by mineral matter or deposits which could not be removed by a reverse current of cold water that it would be useless. To obviate this difficulty is the object of my invention.

The annexed drawing, to which reference is made, fully illustrates my invention.

A represents the filter-case, within which are suitable perforated partitions, with the filtering material between them. The interior of the filter may, however, be arranged in any of the known and usual ways, as I lay no claim to the same, my invention being applicable to filters of any construction.

The filter-case A is extended below the filter proper, and within said case is a water-back, B, with fire-box C located below the filter.

D is the pipe leading from the water-main, said pipe dividing into two branches, $D^1$ $D^2$, the former leading to the bottom of the filter and the latter to the water-back, and said branch pipes are provided with stop-cocks $d^1$ $d^2$, respectively.

From the top of the filter extend one or more pipes, E, with stop-cocks $a$ as outlets for the filtered water.

F F represent one or more pipes leading from the water-back to the top of the filter, and said pipes are provided with stop-cocks $b\, b$, as shown. G is a smoke-pipe from the fire-box C. H is a waste-pipe, with stop-cock $h$, from the bottom of the filter.

When the filter is in use the water enters through the branch $D^1$, then through the filter, and out through the pipes E.

When it is desired to cleanse the filter by a reverse current of cold water, the stop-cocks $d^1$ and $a\, a$ are closed, and $d^2$, $b\, b$, and $h$ opened. The water will then enter through the pipe $D^2$ into the water-back, pass from thence through the pipes F F to the top of the filter, down through the filter, and out through the waste-pipe H. When, however, it becomes necessary to cleanse the water by a reverse current of hot water, fire is built in the fire-box C. The water takes the same course, but becomes heated while passing through the water-back before it reaches the filter, and will thus cleanse the same of all mineral deposits which are not removed by cold water.

I am fully aware of the patent granted to R. S. Jennings, wherein a reverse current of hot water is passed from the ordinary house-boiler through the filter; and hence I do not claim, broadly, the principle of cleansing filters by a reverse current of hot water.

My invention is principally intended where house-boilers are not in use, and where, hence, no hot water could be made to pass through the filter.

It will readily be seen that with my invention the means for furnishing hot water is incorporated with the filter, and a fire may be made at any time when required for cleansing the filter.

It is evident that the relative location of water-back and fire-box with the filter is immaterial, and may be changed according to circumstances without departing from the spirit of my invention, the essential feature of which is the providing a filter with its own means for supplying hot water without depending upon any outside fixtures or contrivances.

Having thus described my invention, what I claim as new, and desire to secure by Letters Patent, is—

1. A filter provided with a water-back and a fire-box and a system of pipes, substantially as herein described, for cleansing the filter by a reverse current of hot water when required, as set forth.

2. A filter provided within the same case with means for heating water for cleansing the same, substantially as herein set forth.

3. The combination of the filter A, water-back B, fire-box C, with smoke-pipe G, inlet-pipe D, with branches $D^1 D^2$, outlet-pipes E E, connecting-pipes F F, and waste-pipe H, the various pipes being provided with stop-cocks, all substantially as and for the purposes herein set forth.

In testimony that I claim the foregoing I have hereunto subscribed my name in the presence of two witnesses.

CHAS. T. HAAS.

Witnesses:
 GEORGE E. UPHAM,
 JAS. J. SHEEHY.